US008679446B2

(12) United States Patent
Iyer

(10) Patent No.: US 8,679,446 B2
(45) Date of Patent: Mar. 25, 2014

(54) MICRONIZED SULPHUR POWDER AND METHOD OF PRODUCTION OF SAME

(76) Inventor: Satish R. Iyer, Calgary (CA)

( * ) Notice: Subject to any disclaimer, the term of this patent is extended or adjusted under 35 U.S.C. 154(b) by 171 days.

(21) Appl. No.: 13/263,879

(22) PCT Filed: Mar. 9, 2010

(86) PCT No.: PCT/CA2010/000331
§ 371 (c)(1),
(2), (4) Date: Oct. 11, 2011

(87) PCT Pub. No.: WO2010/102389
PCT Pub. Date: Sep. 16, 2010

(65) Prior Publication Data
US 2012/0128981 A1 May 24, 2012

(30) Foreign Application Priority Data

Mar. 9, 2009 (CA) ...................................... 2657531

(51) Int. Cl.
*C01B 17/00* (2006.01)
*C01B 17/02* (2006.01)
*C01B 17/10* (2006.01)
(52) U.S. Cl.
USPC ....................................... 423/511; 423/567.1
(58) Field of Classification Search
USPC .............................................. 423/511, 567.1
See application file for complete search history.

(56) References Cited

U.S. PATENT DOCUMENTS

| 2,348,736 | A | * | 5/1944 | Heath | ............................. 516/96 |
| 2,586,914 | A | | 2/1952 | Carney | |
| 3,504,061 | A | | 3/1970 | Elliott | |
| 4,133,669 | A | | 1/1979 | Caldwell et al. | |
| 4,330,319 | A | | 5/1982 | Bexton et al. | |
| 4,394,150 | A | | 7/1983 | Garrison, Jr. et al. | |
| 5,120,345 | A | | 6/1992 | Kayaert et al. | |
| 5,264,031 | A | * | 11/1993 | Palmer et al. | .................. 106/401 |
| 5,788,896 | A | | 8/1998 | Bertam et al. | |
| 7,470,304 | B2 | | 12/2008 | Keenan et al. | |

FOREIGN PATENT DOCUMENTS

| CA | 1079905 | 6/1980 | |
| GB | 1119363 | 7/1968 | |
| WO | WO 2008/041132 A2 * | 4/2008 | .............. C01B 17/00 |
| WO | 2010102389 | 9/2010 | |

* cited by examiner

Primary Examiner — Timothy Vanoy
(74) Attorney, Agent, or Firm — Bennett Jones LLP

(57) ABSTRACT

A process is provided for the production of a micronized sulphur powder product as well as a micronized sulphur cake intermediate. Production of the micronized sulphur powder using this process, which comprises preparation of a micronized sulphur emulsion from molten sulphur and a dispersant solution, from which the dispersant solution is subsequently removed, produces a product of superior quality, and the method of production itself has enhanced safety and economic attributes.

24 Claims, 2 Drawing Sheets

MICRONIZED SULPHUR POWDER AND METHOD OF PRODUCTION OF SAME

CROSS REFERENCE TO RELATED APPLICATIONS

This application is a National Phase entry of International Patent Application Serial No. PCT/CA2010/000331 filed 9 Mar. 2010, and claims the benefit of priority of Canadian Patent Application No. 2,657,531 filed 9 Mar. 2009, which are hereby incorporated by reference.

This invention is in the field of mineral processing, and more particularly deals with a process for converting lump sulphur into a micronized powder.

BACKGROUND

Elemental sulphur is an essential ingredient in a number of industrial applications including in crop fertilizer applications, ammunition manufacture, and rubber vulcanization, to name a few.

One of the problems in the prior art with the use of particulate sulphur in fertilizer applications is that when applied in the form of large particles greater than 100 micron size, elemental sulphur is very slow in reaching the needy roots of plants to pass on the required nutrients. This is because sulphur, in its original elemental form, is insoluble in water and hence cannot be absorbed by the roots of plants. However, bacteria in the soil feed on elemental sulphur and convert it to water soluble sulphate which is subsequently readily absorbed by plant roots.

The problem with direct application of water soluble sulphate fertilizers is that the method suffers from over dissolution, uncontrolled release and leaching during incessant precipitation leading to poor returns on farm input investment. However, with smaller sized particulate sulphur, at a particle size less than about 30 (<30) microns, absorption and conversion of particulate sulphur is optimal and much more effective. When applied to plants, finely divided micronized sulphur can provide the plants with nutrients in the same season of application—as such micronized sulphur (<30 microns) has tremendous value and application in the fertilizer industry. On this basis, if there were a practical or effective means of producing large quantities of micronized sulphur particles this would be of great use in the fertilizer industry.

There is also application for the use of micronized sulphur in ammunition manufacturing, since finely divided sulphur particles would combust with greater efficiency and effectiveness. Use of a consistent finely sized micronized sulphur particle in ammunition manufacture would, it is believed, result in the manufacture of a higher quality and more consistent ammunition.

The automobile and aviation tire manufacturing industry also use large quantities of fine sulphur powder for vulcanization of rubber. The reaction between sulphur and rubber results in very hard and durable rubber that can be maintained over a comparatively wide range of temperature. Thus, the finer the sulphur powder the better would be the reaction with rubber and the higher would be the quality of tire produced. In other applications, the paint industry also uses very fine sulphur powder as a color blend. Micronized sulphur is widely used as a fungicide, insecticide and pesticide, and also has medicinal uses for treating skin ailments in humans.

Current processes for the production of micronized sulphur powder are dangerous and energy inefficient. Micronized sulphur powder is quite often presently produced by pulverizing sulphur lumps in mechanical milling equipment. Particularly in circumstances where very finely sized particles are acquired, conventional milling results are dependent upon substantial energy consumption. As such, if it was possible to determine a method of production of micronized sulphur powder which either used means other than mechanical milling or a mechanical milling process that significantly decreased the energy requirement, it would be desirable from an economic perspective.

Another problem with current day milling technologies used to produce micronized sulphur powder is the fire and explosion risk and hazard presented by the milling process. Sulphur is a flammable and explosive substance, and by its nature mechanical milling can result in risk exposure to explosion. As such, people who are milling sulphur into a micronized product have in the past needed to install expensive fire prevention systems to protect personnel and prevent accidents. If it were possible to find a method of micronized and sulphur that lessen the risk of fire or explosion this would also be desirable over methods in the prior art.

Other shortcomings of the grinding process include the fact that the work environment is very loud for the operating personnel. In terms of the grinding media and the equipment as a whole, conventional grinding or milling technology requires ongoing maintenance and regular media replacement, which lead to increased production costs. Reduction of maintenance and media costs would be desirable, as well as the fact that if there was a means of micronized in sulphur without the need for grinding, contamination and the final product could theoretically be reduced insofar as the grinding media itself [albeit in minor quantities] would not contaminate the final product.

SUMMARY OF THE INVENTION

It is an object of the present invention to provide a method for the production of micronized sulphur powder from lump sulphur that overcomes problems in the prior art.

In a first embodiment the present invention provides a method for the production of micronized sulphur particles. The method comprises heating solid sulphur stock to a temperature above a melting point of sulphur such that the sulphur stock melts and forms liquid sulphur; preparing a dispersant solution by mixing a dispersant agent with solvent in selected proportions; containing the dispersant solution under pressure and raising a temperature of the dispersant solution to a temperature about equal to the temperature of the liquid sulphur; blending the liquid sulphur and dispersant solution together to produce an emulsified sulphur suspension; cooling the emulsified sulphur suspension to a temperature below the melting point of sulphur; removing the dispersant solution from the emulsified sulphur suspension to leave sulphur particles; and drying the sulphur particles.

In a second embodiment the present invention provides a method for the production of a micronized sulphur powder product. The method comprises in an open container, heating solid sulphur stock to a temperature above a melting point of sulphur such that the sulphur stock melts and forms liquid sulphur; preparing a dispersant solution in an open container by mixing a dispersant agent with solvent in selected proportions; pumping the dispersant solution through a pressurized heat exchanger to raise the temperature of the dispersant solution while containing same under pressure to maintain the dispersant solution in a liquid state, and pumping the dispersant solution from the heat exchanger to a pressurized blending chamber; pumping the liquid sulphur into the blending chamber and blending the liquid sulphur with the dispersant solution to form an emulsified sulphur suspension; pumping the emulsified sulphur suspension out of the homogenizer and cooling the emulsified sulphur suspension to a temperature below the melting point of sulphur; filtering the cooled emulsified sulphur suspension to remove the dispersant solution from the emulsified sulphur suspension to leave a cake of sulphur particles; and drying the cake to form the micronized sulphur powder product.

In a third embodiment the present invention provides a micronized sulphur powder product wherein 95% of the particles in the sulphur powder product are less than about 100 microns in size.

The present invention provides an enhanced or improved method for the production of micronized sulphur from lump sulphur that will decrease the energy consumption and costs of production of same over the methods currently used in the prior art.

The present invention provides a micronized sulphur powder created as a result of the emulsion of molten sulphur with a dispersant agent solution, and the subsequent recovery of the dispersion agent solution there from, which micronized sulphur powder will provide benefits over sulphur powder produced in accordance with conventional milling practices.

The invention includes a method of production of a micronized sulphur powder product. The method of production of micronized sulphur powder disclosed herein will result in the production of a micronized sulphur powder product which is heretofore difficult or impossible to produce in accordance with conventional milling techniques.

The first step in the production of the micronized sulphur powder of the present invention will be the preparation of molten sulphur, in a tank or heating vessel of some kind. The published melting point of pure sulphur is about 115° C. Generally, industrially obtained sulphur melt is obtained in the range of about 115° C. to about 150° C. The melting is usually performed in a vessel or like container such that the further processing of the sulphur can be performed.

In addition to the melting of the sulphur, the other introductory step to the method of the present invention is the preparation of a dispersant solution for blending or homogenizing with the molten sulphur. This step comprises mixing of one or more dispersant agents with water into a dispersant solution, which is then superheated into the same range of temperature of the molten sulphur, is the next stage in the process.

Such superheating of dispersant solution is performed in a heat-exchanger or boiler under elevated pressures in order to keep the dispersant in liquid form as the temperature rises above the boiling point. Various types of dispersant agents can be used, and the solid concentration or density of the final sulphur emulsion can be affected by adjustment of the concentration of the dispersant solution.

In some embodiments, carboxy-methyl-cellulose is used as a dispersing agent. In some embodiments Naphthalene Sulfonate compounds such as in the trade product Morwet™ are used as a dispersant agent. In some embodiments a surfactant is effective for use as a dispersant agent. Those of skill in the art will be readily able to determine those dispersing agents that will be compatible with sulphur and the temperature and pressure parameters inherent in the process of the present invention.

Following preparation of the superheated dispersant solution, and the molten sulphur, a key step in preparation of the micronized sulphur powder in accordance with the process of the present invention is the blending or homogenization of the molten sulphur and the heated dispersant solution to produce an emulsified sulphur suspension. Various types of emulsification, homogenization, or blending equipment can be used, as will be understood by those skilled in the art.

Following preparation of the emulsified sulphur suspension, that suspension will be cooled, using a heat exchanger or other similar equipment, to below the melting point of the sulphur, and below the boiling point of the dispersant solution. On the cooling of the emulsified sulphur suspension in this fashion, the finely dispersed and molten sulphur droplets in that emulsification will solidify, forming micronically sized solid sulphur particles. Such cooling can also be achieved without a heat-exchanger by simply flashing and cooling the hot sulphur emulsion to a lower pressure.

In some embodiments, sulphur particles with an average size of less than about 100 microns are produced. In some embodiments, sulphur particles with an average size of less than about 30 microns are produced. Sulphur particles smaller than 1 micron size can also be produced in substantial quantities.

Further processing of the cooled emulsified sulphur suspension, which at this point contains the micronically sized solid sulphur particles would be to recover or to remove the dispersant solution from that suspension, using a centrifuge or other filtration device. This stage of the process would yield a micronized sulphur cake which could then as a last step be dried or comminuted into a micronized sulphur powder.

The micronized sulphur powder of the present invention could be blended with additional ingredients in certain applications, and these subsequent blending steps could be added to the basic process of the present invention.

The method of the present invention will result in the production of a consistent and high-quality micronized sulphur powder which is produced with far less energy requirements than prior art milling techniques. In addition to less energy consumption, the wear and tear on equipment is far less, and the method of the present invention uses widely available and non-sophisticated commercial equipment in the production of the micronized sulphur powder in question. The method of production of the present invention is also far more safe than prior art milling techniques in terms of reduced likelihood of explosion or other damage.

In addition to the novel method of production of sulphur powder disclosed herein, the micronized sulphur powder which is the product of the process of the present invention represents an advance in the production of this product over the state of the art. The product which is produced using the method of the present invention, micronized sulphur powder, will be comprised of particles of relatively consistent size and a very small micron measurement. Micronically sized sulphur particles have significant commercial utility and benefits. In addition, the micronized sulphur powder of the present invention will be of an increased quality or purity insofar as the impurities generated from milling equipment will not be present.

In addition to the micronized sulphur powder of the present invention, the intermediate micronized sulphur powder cake is also a product which may have commercial utility and which is produced with significantly less energy and with excellent quality compared to products available in the prior art.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labelled with like numbers, and where:

DETAILED DESCRIPTION OF THE ILLUSTRATED EMBODIMENTS

As described in further detail below, the present invention comprises a method for the production of a micronized sulphur power product, and that product itself, which method offers advantages over prior art methods of production of same and yields a micronized sulphur power product of a higher quality than prior art methods.

Method of Production of Micronized Sulphur Powder

Prior art methods of production of sulphur powder have typically concentrated on mechanical milling processes. Mechanical milling of lump sulphur, particularly where the desired effect is to mill that product to a powder of a small particle size has many limitations including the safety of the process itself as well as that mechanical milling of this nature consumes large quantities of energy and is hard on the milling equipment itself.

Figure 1:
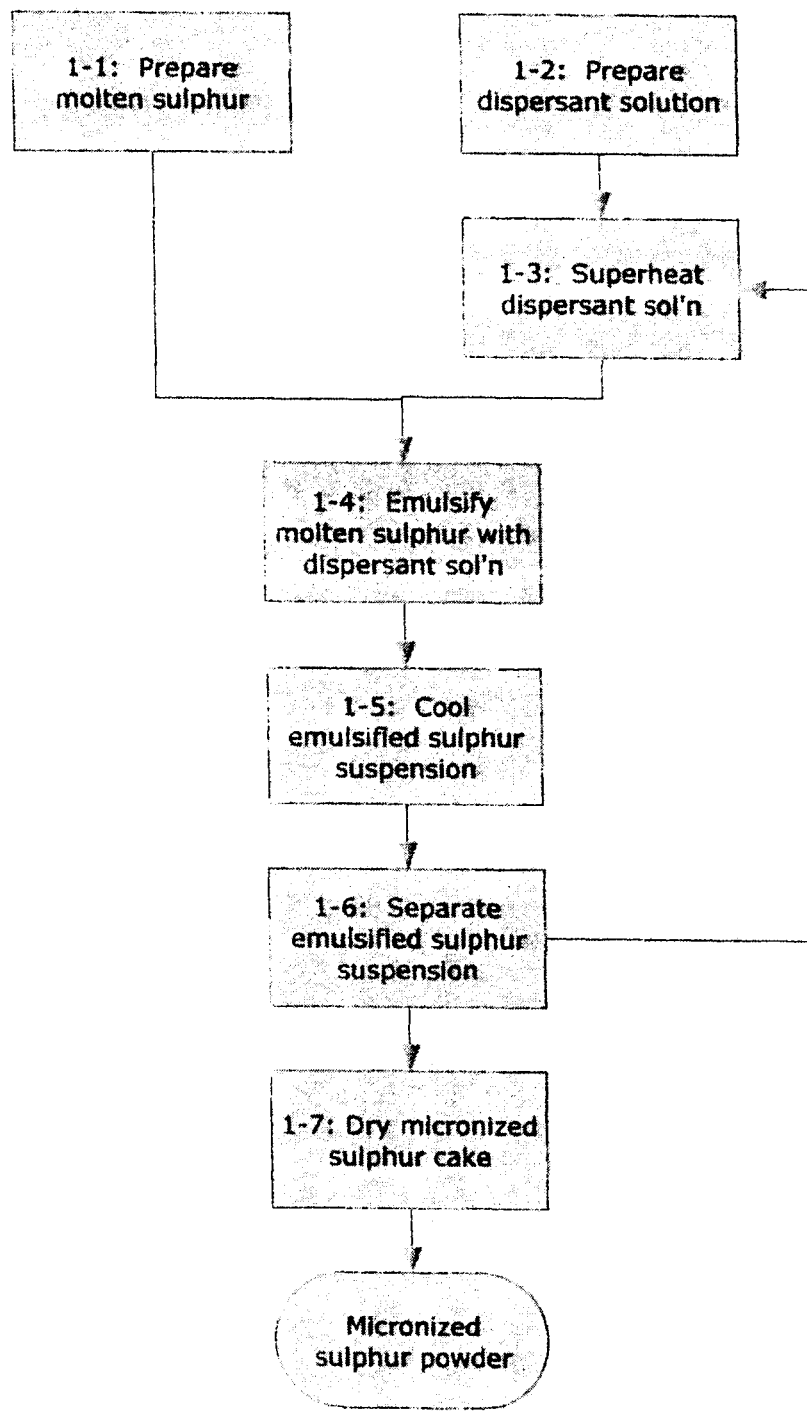
FIG. 1 is a flow chart demonstrating one embodiment of the process for manufacturing micronized sulphur of the present invention.

FIG. 1 is a flow chart demonstrating one embodiment of the method of production of a micronized sulphur powder product in accordance with the present invention.

Overall the first grouping of steps in this process is directed towards the production of a molten sulphur emulsion, which upon drying or further processing will result in the creation of the desired powdered sulphur product of the desired particle size.

The first two steps in the method of FIG. 1 are the production of molten sulphur and a superheated water dispersant solution, for subsequent blending. Molten sulphur is produced in a heating vessel by heating lump sulphur or other sulphur starting stock to above the melting point of sulphur. This generally requires heating to a temperature between about 115 and 150° C. Means for mixing the melting sulphur can be included to improve the rate of melting where desired.

Production of the molten sulphur is shown at Step 1-1 in the flow chart of FIG. 1. The specific types of equipment which can be used to produce molten sulphur will be understood to those skilled in the art and are all contemplated within the scope hereof and equipment, using adjusted process parameters, which will accomplish the objective of allowing for the melting and pumping of sulphur under pressure is contemplated within the scope of the present invention.

Step 1-2 of FIG. 1 shows the second startup step which is conducted in the method of the present invention, which is the preparation of a dispersant solution for blending with the molten sulphur. Various dispersant agents can be used in the dispersant solution in question, including but not limited to dispersant agents such as Naphthalene Sulfonate compounds found in Morwet™ or CMC (Carboxy Methyl Cellulose), or surfactant. Other dispersant agents will be compatible with the method of the invention, and those skilled in the art will be able to readily determine those dispersants that are useful.

The ratio or proportion of dispersant agent to be added by volume to water to form the dispersant solution being prepared in the practice of the present method will vary, dependent upon the desired outcome of the method.

Dependent upon the desirable solids content in the homogenized solution yielded upon blending of the dispersant solution with the molten sulphur, and the characteristics of the specific dispersant agent used in the dispersant solution, the ratio or volume of dispersant agent to be added in the production of the solution will be adjusted accordingly. The ratio could also depend on the potency of the dispersant agent.

In the specific case, for example, of the use of carboxy methyl cellulose or naphthalene sulfonate compound as the dispersant agent, it is contemplated that the desirable ratio for use of that dispersant agent in the production of dispersant solution for use in the process of the present invention would be between about 0.001% to about 10%, or between about 1 to about 100 parts per thousand by volume (v/v). It will be understood that the ratio of dispersant agent used will be dependent upon the desired output of the process (e.g. desired average particle size) as well as the characteristics of the particular agent in question and that all such adjustments or modifications to the process are contemplated within the scope of the present invention.

Following blending of water with the dispersant agent or agents which are selected, the dispersant solution is superheated under pressure, using heat exchanges, boilers, hot water generator or other heating equipment which will be understood and known to those skilled in the art, which will accomplish the objective of allowing for the heating of the dispersant solution under pressure to a temperature in a range from about 115° C.-150° C.

In practice a pressure vessel capable of operating in the range from about 25 to about 80 psig, is effective to permit heating of a substantially aqueous dispersant solution to a temperature of between about 115° C. to about 150° C., while substantially maintaining the dispersant solution in liquid form. Depending on the chemical nature of the dispersant solution, more or less pressure will be required to maintain the dispersant as a liquid when it is contacted with the molten sulphur in the homogenizing pressure vessel (or reaction vessel). Those skilled in the art will be able to readily determine the appropriate pressure required in order to maintain the components of the process in a substantially liquid phase, within the desired temperature range.

For the purposes of demonstration, the superheating under pressure of the dispersant solution is shown in FIG. 1 at Step 1-3. In terms of the specific temperature of the heated dispersant solution, the dispersant solution is optimally heated to the same temperature as the molten sulphur.

The next step in the process, shown at Step 1-4, is the blending of the molten sulphur and the heated dispersant solution to produce an emulsified sulphur suspension. Blending of the molten sulphur and heated dispersant solution into an emulsified sulphur suspension could be done using various prior art equipment. Various types of homogenization equipment using mechanical means or by pressure application will be understood to those skilled in the art—for example, this step could be accomplished using a fast rotating mechanical disc type homogenizer, or a high pressure nozzle atomization type of emulsification equipment. The result of this step will be the homogenization or emulsification of minute molten sulphur droplets within the dispersant solution, yielding emulsified sulphur suspension. By varying the speed of the blending apparatus, or the size/pressure of the atomizer spray, the process can be optimized to produce particles of a certain average size, or of a certain maximum or minimum size.

Following discharge from the emulsification or homogenization equipment, the emulsified sulphur suspension is cooled, in a heat exchanger or other similar equipment, to below the melting or boiling point of sulphur. Specifically, the cooling of the emulsified sulphur suspension to below 100° C. for further processing is contemplated. The hot sulphur emulsion can also be cooled by simply flashing it to a lower pressure inside a container.

On cooling of the emulsified sulphur suspension in this fashion, the finely dispersed molten sulphur droplets in that emulsification will solidify, forming micron sized solid sulphur particles. The cooled sulphur emulsion at this point would be very stable as well and could be stored in this form before further processing with just mild mixing or agitation.

Further processing of the emulsified sulphur suspension, once cooled, to yield micronized sulphur cake or powder can again be accomplished using readily available equipment. It is specifically contemplated that the next step in this process would be to recover or remove the dispersant solution from the emulsified sulphur suspension using a filtering device such as a mechanical filter, decanter or centrifuge. This is shown at Step 1-6 in FIG. 1. This would result in the separation of the finely dispersed micronic sulphur particles, created during the emulsification process, from the dispersant solution which was initially created at Step 1-2 and blended with the molten sulphur.

Recovery of the dispersant solution from the particulate sulphur created to allow for the recycling of the dispersant solution or re-feeding the dispersant solution in a continuously operated process, or the recovered dispersant solution could be tanked for subsequent use or reuse in a batch operated process as well.

It is also understood that the dispersant solution once removed from the emulsified sulphur suspension could be discarded but both from the environmental perspective as well as in terms of the economics of subsequent batch processing is contemplated that the dispersant solution could be reused once recovered, perhaps with the adjustment or reconstitution of that dispersant solution with the addition of additional water or dispersant agents to reconstitute it to the appropriate parameters.

Upon separation of the emulsified sulphur suspension, by removal of the dispersant solution from the micronized sulphur particles created therein, the remaining product would be a micronized sulphur cake made up of homogeneous sulphur particles the size of which could be adjusted or determined during the emulsification step of the process, shown at 1-4, by adjusting the operating parameters of the emulsification equipment being used.

In some embodiments, the particle size produce will be determined by process parameters, for example, but without being limiting, the speed of blending, the time of blending, the physical characteristics of blades used in a blending apparatus, pressure of blending, temperature of blending, etc. In some embodiments, the process can be performed to select for particles of a certain average size, for example particles of about 100 microns, or in some embodiments particles of about 30 microns or smaller.

In some embodiments, post-processing handling, for example, the used of defined mesh screens could be used to further enrich for particles of a certain maximum or minimum size. Particles not retained would be returned to the process for remelting and reprocessing according to the method of the invention. Thus, in some embodiments a micronized sulphur product having 95% of the particles less than 100 microns in size could be obtained. In some embodiments a micronized sulphur product having 95% of the particles less than 30 microns in size could be similarly obtained.

The micronized sulphur cake itself may be a product recovered for a particular industrial use, but insofar as it is primarily contemplated that the micronized sulphur cake forms a further intermediate which must be finally processed into powder, the final step in the embodiment of the process of FIG. 1, to yield a micronized sulphur powder, is to dry the sulphur cake, using conventional drying equipment, to obtain dry micronized sulphur powder. This drying step is shown in FIG. 1 at 1-7.

The micronized sulphur powder recovered from the process of the present invention could either be packaged or stored for use in this form, or could be blended with additional ingredients. Blending of the micronized sulphur powder in question with other ingredients dependent upon its end-use will again be a conventional technique or use conventional equipment as will be understood by one skilled in the art and on that basis the specifics of a blending step are contemplated within the scope hereof.

As outlined, the particle size in the sulphur cake recovered in the separation of the emulsified sulphur suspension can be controlled and adjusted by adjusting the operation of the homogenizer equipment used in Step 1-4. Similarly, the desirable solid contents of the emulsified sulphur suspension, between 0.001% to 85%, can be controlled by varying the dispersant quantity in the solution. The claimed invention uses available market equipment thereby reducing the operating and maintenance costs of the machinery. Those skilled in the art understand that many types of equipment or equipment modifications could be used in different production stages or environment to implement or accomplish the method of the present invention.

A Process Example

Figure 2:
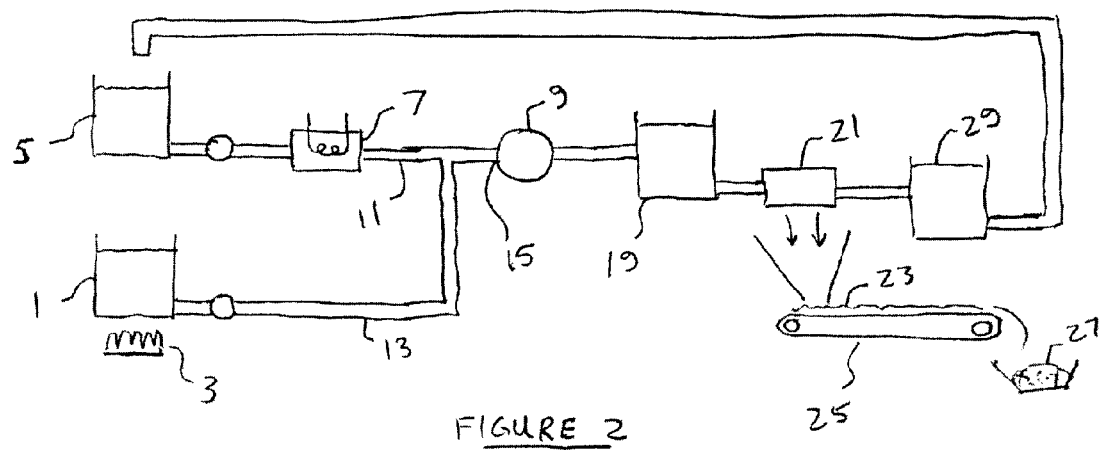
FIG. 2 is a schematic illustration of an embodiment of a process of the invention.

FIG. 2 schematically illustrates an embodiment of a method of the present invention for the production of a micronized sulphur powder product. The method comprises heating solid sulphur stock to a temperature above a melting point of sulphur such that the sulphur stock melts and forms liquid sulphur. The melting point of sulphur is about 115° C. and the sulphur may be heated higher, such as to 150° C. or even 200° C. This can be accomplished by placing the solid sulphur stock into an open sulphur container 1 and heating the stock with a heating medium 3 such as circulation of steam or oil, or the like as is known in the art.

The dispersant solution is prepared by mixing a dispersant agent with solvent in selected proportions in an open dispersant container 5. Those skilled in the art will recognize that many products can be used as a dispersant agent for example a Naphthalene Sulfonate compound, such as is found in the trade product Morwet™, made by Akzo Nobel or Carboxy Methyl Cellulose, or a surfactant, at a suitable proportion such as 1 and 100 parts per thousand volume of the dispersant solution. Typically it is contemplated that the solvent will be water, but other solvents might also be used.

For example it has been found that using Morwet™ D-425 at about 0.5 to 1.5 weight % with a water solvent produces a satisfactory dispersant solution, and results in a sulphur particle size of about 30 microns.

The dispersant solution is contained under pressure and heated to a temperature about equal to the temperature of the liquid sulphur. In the illustrated embodiment of FIG. 2, the dispersant solution is pumped from the dispersant container 5 through a pressurized heat exchanger 7 to raise the temperature of the dispersant solution while containing same under pressure to maintain the dispersant solution in a liquid state. The required pressure to keep the dispersant solution in liquid form will depend on the temperature to which the dispersant is heated to and the pressure could range anywhere between 20 psig to 200 psig.

The dispersant solution at the desired temperature flows from the heat exchanger 7 to a pressurized blending chamber 9 through a dispersant conduit 11. The liquid sulphur is pumped from the sulphur container 1 into the blending chamber 9 through a sulphur conduit 13 and blended with the dispersant solution to produce an emulsified sulphur suspension.

For thorough blending, the blending chamber 9 can be provided by a homogenizer, for example a fast rotating mechanical disc type homogenizer, or a high pressure nozzle atomization type of homogenizer. In the illustrated embodiment, the homogenizer blending chamber 9 has an input port 15, and the liquid sulphur and dispersant solution are pumped into the input port 15 together. The dispersant conduit 11 and sulphur conduit 13 are connected at a T-connection and then enter the blending chamber 9 together in selected proportions achieved by coordinating the volume pumped from each of the containers 1 and 5.

In the illustrated example the sulphur was present in the emulsified sulphur suspension at about 65-70 weight %. Sulphur content has been as high as 85 weight % however flowability of the solution becomes problematic. Higher sulphur content results in reduced dispersant solution and therefore reduces operating costs.

The proportion of dispersant agent in the dispersant solution will be related to the proportion of sulphur that can be present in the emulsified sulphur suspension for satisfactory results.

The emulsified sulphur suspension, still under pressure, flows out of the homogenizer blending chamber 9 and is cooled to a temperature below the melting point of sulphur, ie. below about 115° C. In the illustrated embodiment the emulsified sulphur solution is cooled by pumping the emulsified sulphur solution into an open vessel 19 at atmospheric pressure such that vaporization of the solvent in the dispersant solution causes cooling. Further cooling with heat exchangers or the like can be provided as well.

Then the dispersant solution is removed from the emulsified sulphur suspension to leave sulphur particles. In the illustrated embodiment of FIG. 2, the cooled emulsified sulphur suspension is filtered to remove the dispersant solution from the emulsified sulphur suspension to leave a cake of sulphur particles. A continuous filter, such as a belt filter 21, is used such that the process is continuous.

The caked sulphur particles 23 are dried with a drier 25 to form the micronized sulphur powder product 27.

The dispersant solution removed from the emulsified sulphur suspension can be reprocessed to the selected proportion of dispersing agent and solvent in a process step 29 and then returned to the dispersant container 5 to be re-used.

It is contemplated as well that it could be possible that the solid sulphur stock and the dispersant solution could be mixed together and then heated to the temperature above a melting point of sulphur, and blended together to produce an emulsified sulphur suspension after the solid sulphur stock has melted.

Micronized Sulphur Powder Product

In addition to providing for an enhanced method of production of a micronized sulphur powder product, the sulphur powder product is contemplated to be novel and within the scope of protection hereof, as a micronized sulphur powder product wherein 95% of the particles in the dried cake are less than about 100 microns or less than about 30 microns in size, as is made with the present process, is not known in the art.

The sulphur powder product of a consistently low micron size produced in accordance with the method of the present invention enjoys several functional and economic benefits over sulphur powder products produced using prior art milling methods.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A method for the production of micronized sulphur particles, the method comprising:
    heating solid sulphur stock to a temperature above a melting point of sulphur such that the sulphur stock melts and forms liquid sulphur;
    preparing a dispersant solution by mixing a dispersant agent with solvent in selected proportions;
    containing the dispersant solution under pressure and raising a temperature of the dispersant solution to a temperature about equal to the temperature of the liquid sulphur;
    blending the liquid sulphur and dispersant solution together to produce an emulsified sulphur suspension;
    cooling the emulsified sulphur suspension to a temperature below the melting point of sulphur;
    removing the dispersant solution from the emulsified sulphur suspension to leave sulphur particles; and
    drying the sulphur particles.

2. The method of claim 1 comprising heating the solid sulphur stock to a temperature above about 115° C.

3. The method of claim 2 wherein the dispersant agent is one of a Naphthalene Sulfonate compound, Carboxy Methyl Cellulose, and surfactant.

4. The method of claim 3 wherein the dispersing agent from is present at between 1 and 100 parts per thousand volume of the dispersant solution.

5. The method of claim 4 wherein the dispersant solution is prepared in an open container and pumped through a pressurized heat exchanger to raise the temperature of the dispersant solution while containing same under pressure to maintain the dispersant solution in a liquid state, and from the heat exchanger to a pressurized blending chamber.

6. The method of claim 5 wherein the liquid sulphur is pumped into the blending chamber and blended with the dispersant solution to form the emulsified sulphur suspension.

7. The method of claim 6 wherein the blending chamber comprises a homogenizer.

8. The method of claim 7 wherein the homogenizer has an input port, and wherein the liquid sulphur and dispersant solution are pumped into the input port together in selected proportions.

9. The method of claim 8 wherein the emulsified sulphur suspension flows out of the homogenizer and is cooled to a temperature below the melting point of sulphur.

10. The method of claim 9 wherein the emulsified sulphur solution is cooled by pumping the emulsified sulphur solution into an open vessel at atmospheric pressure such that vaporization of the solvent in the dispersant solution causes cooling.

11. The method of claim 10 wherein the cooled emulsified sulphur suspension is filtered or centrifuged to remove the dispersant solution from the emulsified sulphur suspension to leave a cake of sulphur particles.

12. The method of claim 11 wherein the cooled emulsified sulphur suspension is filtered with a continuous filter, such that the process is continuous.

13. The method of claim 12 wherein the continuous filter comprises a belt filter.

14. The method of claim 1 wherein the solid sulphur stock and the dispersant solution are mixed together and then heated to the temperature above a melting point of sulphur, and blended together to produce an emulsified sulphur suspension after the solid sulphur stock has melted.

15. The method of claim 14 wherein the dispersant solution removed from the emulsified sulphur suspension is reprocessed to the selected proportion of dispersing agent and solvent and re-used.

16. A method for the production of a micronized sulphur powder product, the method comprising:
  in an open container, heating solid sulphur stock to a temperature above a melting point of sulphur such that the sulphur stock melts and forms liquid sulphur;
  preparing a dispersant solution in an open container by mixing a dispersant agent with solvent in selected proportions;
  pumping the dispersant solution through a pressurized heat exchanger to raise the temperature of the dispersant solution while containing same under pressure to maintain the dispersant solution from the heat exchanger to a pressurized blending chamber;
  pumping the liquid sulphur into the blending chamber and blending the liquid sulphur with the dispersant solution to form an emulsified sulphur suspension;
  pumping the emulsified sulphur suspension out of the homogenizer and cooling the emulsified sulphur suspension to a temperature below the melting point of sulphur;
  filtering the cooled emulsified sulphur suspension to remove the dispersant solution from the emulsified sulphur suspension to leave a cake of sulphur particles; and
  drying the cake to form the micronized sulphur powder product.

17. The method of claim 16 wherein the blending chamber comprises a homogenizer.

18. The method of claim 17 wherein the homogenizer has an input port, and wherein the liquid sulphur and dispersant solution are pumped into the input port together in selected proportions.

19. The method of claim 18 wherein the emulsified sulphur solution is cooled by pumping the emulsified sulphur solution into an open vessel at atmospheric pressure such that vaporization of the dispersant solution causes cooling.

20. The method of claim 16 wherein the cooled emulsified sulphur suspension is filtered with a continuous belt filter, such that the process is continuous.

21. The method of claim 20 wherein the average sulphur particle size is less than about 100 microns.

22. The method of claim 21, wherein the average sulphur particle size is less than about 30 microns.

23. A micronized sulphur powder product wherein 95% of the particles in the sulphur powder product are less than about 100 microns in size.

24. The micronized sulphur powder product of claim 23 wherein 95% of the particles in the sulphur powder product are less than about 30 microns in size.

\* \* \* \* \*